Sept. 16, 1969  YOSHIO SHIMIZU  3,466,872

AUTOMATIC WATERFLOW APPARATUS

Filed March 20, 1967  3 Sheets-Sheet 1

INVENTOR.
Yoshio Shimizu

By
Attorney.

INVENTOR.
Yoshio Shimizu

United States Patent Office 3,466,872
Patented Sept. 16, 1969

3,466,872
AUTOMATIC WATERFLOW APPARATUS
Yoshio Shimizu, 106 Enoki-cho, Saitama-ken,
Kumagaya-shi, Japan
Filed Mar. 20, 1967, Ser. No. 629,855
Int. Cl. E02b 7/20; G05d 11/00
U.S. Cl. 61—22                     15 Claims

ABSTRACT OF THE DISCLOSURE

There is provided a gate in a waterway, and downstream and remote from the gate a control station at which a float rises and falls with the water level thereat. The gate is motor-operated, and operating and control circuitry of the motor includes the float so that the gate is normally operated in opening and closing directions when the water level at the control station is below and above predetermined lower and upper limits, respectively, with timing means being included in the circuitry to delay motor response to a call for gate opening or closing and periodically interrupt motor operation while the call persists so that the gate will respond in step-by-step motion. Provisions are also made automatically to close the gate under special conditions, i.e., when at any time the water level at the gate drops below the latter or when on a call for more water the gate reaches its fully open position, in either event of which the timing means are inoperative and the motor operates without delay and interruption. Further, a waterflow meter is operative except under the stated special conditions.

The present invention relates to an automatic water distribution installation and more particularly to an improved waterflow dividing installation capable of automatically dividing and distributing water from a main waterway to branched waterways through gates, and precisely measuring the amount of water thus divided.

Division of waterflow for distribution in a channel or ditch on a plain or other level lands has hitherto been attempted by methods of proportional distribution employing the principle of circular tank diversion or Parshall Flume or by use of a Neyrpic gate by which the amount of divided waterflow was measured in in maintaining the level of water and the opening of the gate nearly constant. However, difficulties were encountered with these methods because such proportional distribution is not efficient since the level of water is always variable in the current upstream of the gate and the Neyrpic gate is not operable in waterways having floating materials.

Therefore, the principal object of the present invention is to provide an installation for automatically controlling the gate so that a constant water level may be maintained at a preferred place of measurement in the current of waterflow downstream of the gate.

Another object of the present invention is to provide an installation for determining water levels by which the amount of divided water can be measured preferably by remote control.

Another object of the present invention is to provide an installation of this type which is applicable to any kind of gate operable by a motor.

Still another object of the present invention is to provide an installation for measurement at a central station integrated amounts of water in response to lapse of time.

The present invention thus achieves substantially constant water levels in the divided water, with proper selection of a control station in the water way downstream of and remote from the gate assuring a normal current flow and avoiding a control location adversely affected by backflow of water.

To establish a relation between the water flow quantity and the water depth of the waterway, a formula concerning the water flow may be set up by finding the cross-sectional areas and gradients of the waterway, for which a curve diagram of the water flow quantity and the water depth is prepared to thereby obtain the accurate flow quantity by selecting the applicable water depth.

These and other features of the invention will be best understood from the following description of a preferred embodiment given by way of illustration and shown in the accompanying drawings in which, FIG. 1 is a side elevational view of a control component of the water regulating installation;

Figure 1:
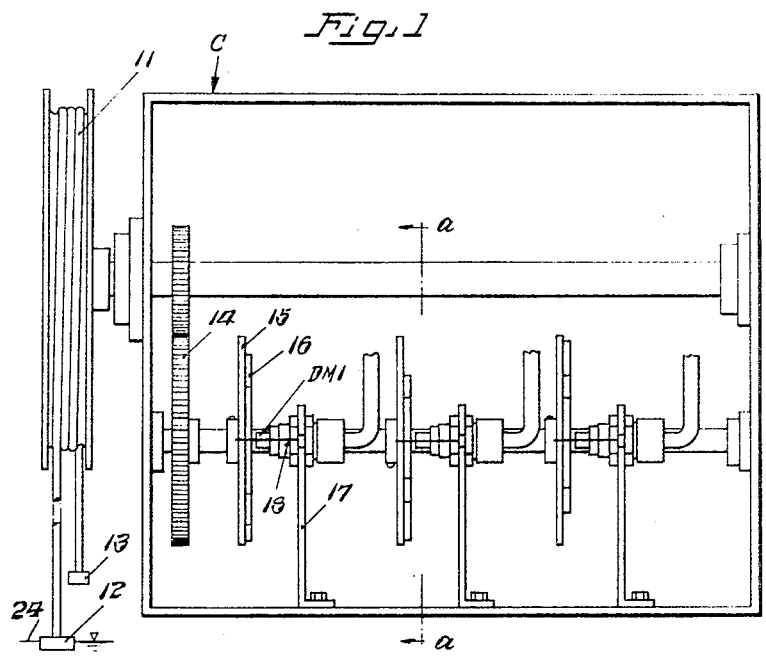
Figure 2:
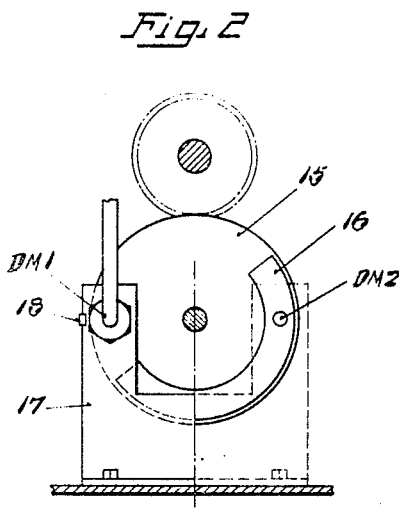
FIG. 2 is a cross-sectional view of the control component of FIG. 1, taken on the line a—a of FIG. 1.
Figure 4:
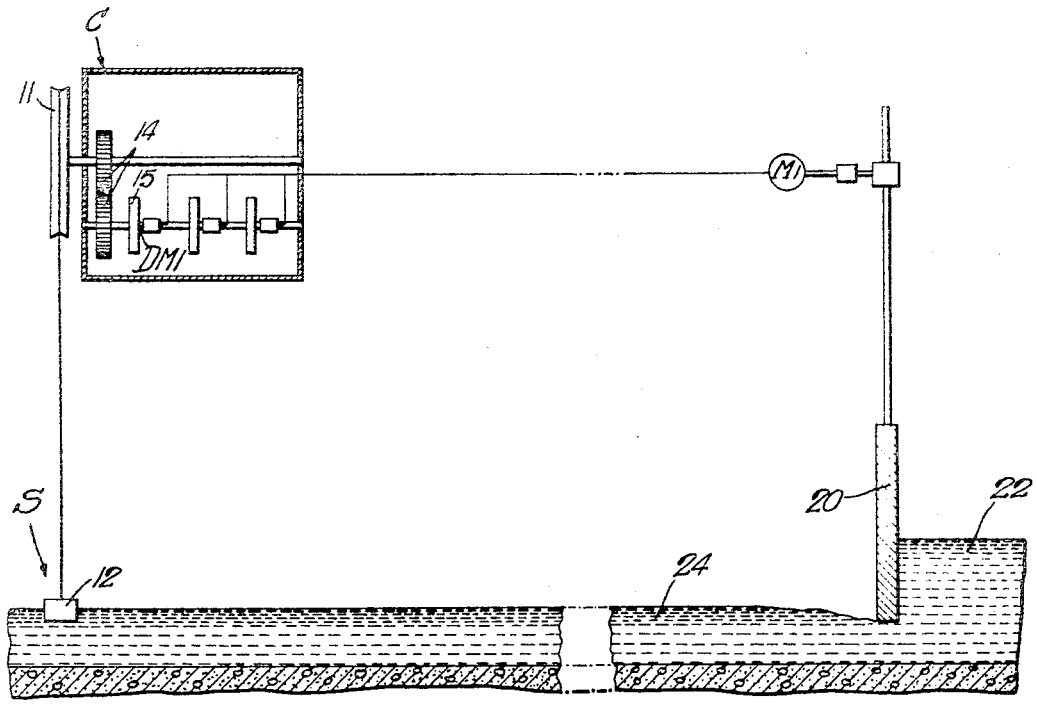
FIG. 4 is a fragmentary section through a waterway divided by the installation.

Referring to FIG. 1, there is shown one of the control components C of the installation providing a float 12 on one end of a flexible cable that is led over a pulley 11 and carries at its other end a balancing weight 13. Thus, when the water level changes the float 12 will rise and fall with it and the pulley 11 will be turned accordingly. Responsive turning motion of the pulley 11 is transmitted to a rotatably mounted disc 15 through gearing 14. Carried by the disc 15 is an arcuate conductive track 16 (FIG. 2) which faces a pair of conductors DM1 and DM2 on a mounting 17, with the conductors DM1 and DM2 establishing preferably contactless electrical connection with the track 16 when in operative alignment therewith as in the case of DM2 in FIG. 2, for example. Normal mean level of the passing water may be indicated by a dial (not shown) on the disc 15 and a fixed level recorder 18. When the water level at the float 12 is anywhere between 0 and a predetermined lower normal limit near the main level, the track 16 is in alignment with the conductor DM1 to thereby cause, in normal operation of the installation, further opening of a gate 20 upstream and remote from the float 12 (FIG. 4) in order to admit water from a main waterway 22 through the gate 20 and into a divided waterway 24 starting at the gate. Conversely, when this water level is above a predetermined upper normal limit, also near the mean level, the track 16 is in alignment with the conductor DM2 (FIG. 2) to thereby cause further closing of the gate 20 in order to admit less water into the divided waterway 24. The control component C is located at a control station S in the divided waterway 24 remote from the gate 20 (FIG. 4). The gate 20 is operated in opening and closing directions by a motor M1 (FIGS. 4 and 5), and the operating circuitry of this motor is in normal operation of the installation controlled by the track 16 and either of the conductors DM1 and DM2 of the control component C at the control station S, as will be described further.

Assuming now that the gate 20 is fully closed, and it is desired to flow water from the main waterway into the divided way 24, the float 12 will then be at 0 water level in which the track 16 is in alignment with the conductor DM1, whereby a gate-opening motor circuit is conditioned for closure whenever an operator at a convenient location, preferably a remote central station (not shown), closes a switch. With the gate-opening motor circuit thus closed, the gate 20 will be raised and water from the main way 22 will flow into the divided way 24, with the float 12 then rising with the water level at the station S and thus causing movement of the track 16 relative to the conductor DM1 of the control component C until the track moves out of operative alignment with this conductor and thereby opens the gate-opening motor circuit. When this happens, the water level at the station S is at the aforementioned lower normal limit. As long as the water level at the station S then remains within the lower and upper normal limits the gate 20 will remain in its partially open position in which it stopped previously. If the water level at the station S next rises above the upper normal limit, for example, the track 16 will move into operative alignment with the conductor DM2 of the control component C and thereby close a gate-closing motor circuit with ensuing lowering of the gate 20 until this circuit is interrupted when on fall of the water level at the station S the conductive track 16 moves out of operative alignment with the conductor DM2. Therefore, in normal operation of the installation the gate 20 will remain in its last partially-open stop position as long as the water level at the station S is within the upper and lower normal limits, and the gate will automatically be moved in opening and closing directions whenever this water level drops below and rises above the lower and upper normal limits, respectively, until the water level is again within these limits.

In normal operation of the installation, the aforementioned gate-opening and gate-closing motor circuits are under additional control of a timer which delays closing of either motor circuit when the control component C at the station S calls for a rise or drop of the gate 20. Thus, with the station S being at a distance from the gate 20, immediate rising response of the gate to a call for more water by the control component C would almost invariably bring about continued rise of the water level at the station S after the call for more water is satisfied and the gate-opening motor circuit stops, with the result that a call for less water would immediately issue at the control component C and the gate be moved in closing direction until this latest call is satisfied. In either case, the water level at the station S would rise or fall excessively, and the gate would move all too frequently in opening and closing directions. Supposing now that on opening of the gate to a given extent the thereby increased waterflow would require 20 seconds, for example, to reach the control station S, this time lapse of 20 seconds is rendered ineffective to cause excessive water rise at station S if the gate responds to the call for more water at the latter station after a 20 second time lapse. This is achieved by the timer which on a call for more water by the control component C delays actual closing of the gate-opening motor circuit for at least the exemplary 20 seconds, and preferably even for a somewhat longer period, say 30 seconds, for example, with the timer then keeping this circuit closed for a predetermined and preferably adjustable period which is shorter, say 5 seconds, for example. Accordingly, the gate will in this exemplary case start to move in opening direction 30 seconds after the call for more water issued, and will move in opening direction for the next 5 seconds and then stop. If then the water level at the station S should still be below the lower normal limit and the call for more water persist, the timer will on stopping of the gate again delay closure of the gate-opening circuit for the exemplary 30 seconds and then close this circuit for the same exemplary 5 seconds. Thus, depending on how long the call for more water persists, the timer will perform in this cyclic fashion and the gate will reach a proper position in steps unless the water level at station S should rise to its normal range on the first gate step. The same holds true, of course, in the gate's response to a call for less water by the control component C, with the timer controlling the gate-closing motor circuit in the same fashion.

The normal range within which the water level at the station S may fluctuate without operation of the gate 20 may be kept fairly narrow and the water level thereat kept within this range with minimum departure therefrom either up or down, by proper consideration of the operating rate of the gate 20 and the relative widths of the gate and waterway and by proper adjustment of the timer for its timed interruptions of the gate-opening and gate-closing circuits. It will also be noted that the explained automatic adjustment of the gate will provide definite amounts of waterflow in the divided waterway 24 which will not vary by virtue of variation in the waterflow in the main waterway 22 or by virtue of floating material in the latter.

The control component C of FIG. 1 shows additional conductive tracks and therewith associated conductors similar to track 16 and conductors DM1 and DM2 which may selectively be used in the control component C to set up different mean water levels at the control station S.

Besides normal operation of the installation as generally described, there are also other operations of the installation under special conditions. Thus, if on a call for more water at the station S the gate 20 should in consequence be operated to its fully open position, a special gate-closing motor circuit will immediately be closed and the gate 20 be moved to its fully closed position without intervention of the timer, whereupon the gate will rise again, still without intervention by the timer. If on this rise of the gate 20 the water level at station S should have returned within the normal operating range, i.e., at which conductor 16 has moved out of operative alignment with the conductor DM1, the gate will come to a stop in the correspondingly open position, and the installation is then restored for normal operation including operation of the timer on any subsequent call by the control component C for correcting the water level at station S. However, if on this renewed rise of the gate 20 following complete closure of the gate the water level at station S will not come up to the normal operating range, the gate will continue to rise to its fully opened position, and this cycle of gate closing and opening will be repeated until the water level at station S finally reaches its normal range or, as will be explained hereinafter, a main closing switch, conveniently at a remote location such as the aforementioned central station, is operated to close another gate closing motor circuit whereby the gate is completely closed and then remains closed, with the apparatus being then inoperative until an opening signal is again sent from the central station.

Another special condition under which the gate 20 will without timer intervention immediately be fully closed and then opened again, and this cycle repeated until normal water level at station S is restored or operation of the installation interrupted by operating the aforementioned main closing switch, arises when at any time the water level in the main way 22 drops below the gate 20, this in order to prevent excessive depletion of water in the main waterway 22 and permit water restoration to normal operating levels therein 1, especially when preferably a plurality of gate-controlled divided waterways are supplied from the main waterway.

The present installation also provides a waterflow meter which measures the quantity of water flowing into the divided way 24 over any length of time. This timer is operative during the described normal operation of the installation, and is inoperative during the aforementioned and also other special operations of the installation. While any suitable flow meter may be used for the purpose, the meter preferably used is of a type which measures the water quantity by intergration in proportion to lapse of time, with the mean water quantity flowing in the divided waterway per time unit as applied to the meter being readily determined within fairly close limits.

The other control components, including electric circuits, employed in the installation will now be described with particular reference to FIG. 3. The gate-operating motor M1 is in this instance operated by three-phase current T, U, R with interposed magnetic switches $s1$ and $s2$, of which switch $s1$ when closed causes operation of the motor M1 in gate-opening direction, and switch $s2$ when closed causes, by phase reversal, operation of the motor in gate closing-direction. The switches s1 and s2, which are normally open, are magnetically closed by associated devices MS1 and MS2, respectively, when the latter are energized. These devices MS1 and MS2 are in normal gate-opening and gate-closing motor circuits, respectively. The normal gate-opening motor circuit is closed across a power source a, b when a normally-open switch S4–1a is closed while the switches TL1, TL2–1 and SOLb in series therewith are also closed. The normal gate-closing motor circuit is closed across the power source a, b on closure of a normally-open switch S5–2 while the switches TL1, TL21 and SCL–2b in series therewith are also closed. Switch S4–1a is associated with a relay R4 and is closed on energization of the latter. Relay R4 is energized when a normally-open switch SDM1 in series therewith is closed. Switch SDM1 is closed when the therewith associated conductor DM1 passes current on closure of its circuit across the power source a, b via a normally-closed main switch S6–1b, a normally-open switch S1–1 which is held closed by an associated relay R1 in parallel with DM1, and conductive track 16. Relay R1 is energized on closure of its circuit via switch S6–1b and a normally-open signal switch S1 which even on momentary closure causes energization of relay R1 and closure of switch S1–1 as long as the main switch S6–1b remains closed. The described circuit of the conductor DM1 is conditioned for closure by the conductive track 16 whenever the same is in operative alignment with the conductor DM1. With the other conductor DM2 being in the same circuit in parallel with the conductor DM1, conductor DM2 will on operative alignment with the conductive track 16 pass current and close the associated switch SDM2 in the circuit of a relay R5 across the power source a, b.

It will thus be understood that in normal operation of the installation, on a call for more or less water at the station S, by operative alignment of the conductive track 16 with the respective conductors DM1 and DM2, the described normal gate-opening and gate-closing motor circuits would be closed immediately at the respective switches S4–1a and S5–2 were it not for operation of the beforementioned timer TL (FIG. 3) which delays the closing of either circuit and also periodically interrupts the same as long as the call for more or less water persists. Of course, either motor circuit will at its respective switch S4–1a or S5–2 be opened whenever the conductive track 16 moves out of operative alignment with the respective conductor DM1 or DM2 in response to rise or fall of the water level at the station S, because the circuit of either conductor DM1 or DM2 will then be interrupted at the conductive track 16 and the associated switch SDM1 or SDM2 opened for deenergization of the respective relay R4 or R5 and ensuing return of the respective switch S4–1a or S5–2 to normally open position.

The timer TL is operative on closure of an operating circuit thereof across the power source a, b which includes normally-closed switches S6–2b and S7–b, a normally-open switch S10a which during normal operation of the installation is held closed by an associated relay R10, normally-open switches S4–4 and S5–1 in parallel which are closed by the respective relays R4 and R5 when energized, and a normally-closed switch TL2–2, which is operatively associated with the switch TL2–1 in either normal motor circuit, with the latter switch being open and closed with the switch TL2–2. Also associated with the timer TL is the other switch TL1 in either normal motor circuit.

Assuming now that in normal operation of the installation a drop of the water level at the station S calls for more water, relay R4 will be energized to close switch S4–1a in the normal gate-opening motor circuit and also close the associated switch S4–4 in the described timer circuit to close the latter and cause operation of the timer. As a result of operation of the timer, the switch TL1 will be held open for a predetermined length of time, such as 30 seconds in the described example, and will only after the lapse of such time close this switch and thereby close the normal gate-opening motor circuit to cause the gate to rise. However, the timer will keep this circuit closed for another predetermined time period, such as 5 seconds in the described example, and then open switch TL2–2 and therewith switch TL2–1 in the motor circuit to thereby open the latter and stop further rise of the gate. If on such opening of the motor circuit the water level at the station S has failed to rise to the normal lower limit, the timer will repeat the described operation of the switches TL1 and TL2–2 after the same time lapses as before, and will keep this up until the water level at the station S rises to or above the normal lower limit to cause interruption of the circuit of the conductor DM1 and therewith deenergization of relay R4 and ensuing opening of the normal gate-closing motor circuit at S4–1a and opening of the timer circuit at S4–4. Of course, the timer TL will perform in exactly the same manner when on a call for less water at the station S the relay R5 is energized with ensuing closure of switch S5–2 in the normal gate-closing motor circuit and closure of the timer circuit at switch S5–1.

For operation of the installation under special conditions when operation of the timer TL is not desired and for restoration of timer operation when operation of the installation is restored to normal, the timer circuit includes the normally-open S10–a under the control of the relay R10. During normal operation of the installation this switch S10–a is held closed by relay 10 the circuit of which is then closed via normally-closed switches S6–2b and S7b, and switch S10–a. However, on operation of the installation under any special conditions either switch S6–2b or S7b will be opened and the described circuit of the relay R10 immediately interrupted.

As already mentioned, one of these special conditions occurs when on a persistent call for more water at the station S the gate reaches its fully open position. In that event, the gate will open the normally-closed opening limit switch SOLb in the gate-opening circuit (FIGS. 3 and 5) and thereby immediately open the latter circuit. However, opening in this fashion of the limit switch SOLb will cause closing of the associated normally-open switch SOLa in a starting circuit of a relay R7 via the latter switch and a normally-closed closing limit switch SCL–2b in the normal gate-closing circuit (see also FIG. 5). With the relay R7 thus energized, an associated normally-open switch S7–2 will be closed, and the also associated normally-closed switch S7b in the timer circuit will be opened to thereby interrupt the latter circuit and cause also return of the switch S10–a to its normally-open position. Switch S7–2, being in the gate-closing motor circuit in parallel with the switches TL1, TL2–1 and S5–2, will close this circuit and thus cause closure of the gate without intervention of the then inoperative timer. Of course, relay R7, when energized on closure of its starting circuit at SOLa, will remain energized even when the limit switch SOLb recloses and thereby reopens the switch SOLa the moment the gate starts to descend from its fully open position, for the relay R7, when energized on closure of switch SOLa, will close the also associated switch S7–1 and thereby close a holding circuit for the relay. With the gate then lowering to its fully closed position, it opens the normally-closed closing limit switch SCL–2b (FIGS. 3 and 5) and thereby opens this gate-closing motor circuit and also the holding circuit of the relay R7. However, since on full closure of the gate in this fashion the call at station S for more water will continue, and since switch S10b is then closed while its operatively associated switch S10a in the timer circuit is open, the gate opening motor circuit will be closed via switches S10b, S4–1a, SMS2, MS1 and SOLb, and MS1 will cause reversal of the motor M1 the moment the gate arrives in its fully closed position and cause renewed opening of the gate. Unless on such renewed opening of the gate the call for more water is satisfied by movement of the conductive track 16 out of operative alignment with the conductor DM1 and ensuing deenergization of the relay R4 and opening of the switch S4–1a, the gate will again fully open and repeat its descent into fully closed position and ascent toward or into fully open position until the call for more water is satisfied or until a closing switch SC is operated to perform in a manner described hereinafter.

Since on the ascent of the gate immediately following its descent from fully open position the relay R7 is deenergized and relay R4 energized, switch S7b is then normally closed and switches S4–3 and S4–1b are closed and opened, respectively by the relay R4, with the result that a starting circuit for a relay R9 is closed via switches S6–2b, S7b and S4–3, whereupon the energized relay R9 closes the associated switch S9–1 and thereby a holding circuit for this relay via switches S6–2b, S7b and S9–1. Of course, relay R9 will again become deenergized if the gate, on reaching fully open position, will again descend with ensuing opening of the switch S7b by the then energized relay R7. On the following ascent of the gate from fully closed position, however, the relay R9 will again be energized and its holding circuit closed. Now, if on such ascent of the gate the call for more water should be satisfied by movement of the conductive track 16 out of operative alignment with the conductor DM1 and ensuing deenergization of relay R4 and opening of the gate-opening motor circuit S4–1a, switch E4–1b will return to its normally-closed position and immediately cause energization of relay R10 and closure of the associated switch S10a, thereby also closing a holding circuit for the relay R10 via switch S10a and returning switch S10b to its normally-open position so that the gate-opening and gate closing circuits may thereafter be closed only via the timer switches TL1 and TL2–1. Also, with the closure of the switch S10a, the timer circuit is conditioned for closure when on energization of either relay R4 or R5 the respective switch S4–4 or S5–1 is closed.

The aforementioned closing switch SC is in a starting circuit of a relay R6 which also includes another normally-closed closing limit switch SCL–1b (FIGS. 3 and 5) which is opened by the gate 20 in its fully closed position. Thus, suppose the normally-open closing switch SC is closed at any time the gate moves down or up again after the gate reached fully open position while a call for more water persists, relay R6 will be energized and close the associated normally-open switch S6–1a and thereby close a holding circuit for this relay via switch S6–1a. Energization of the relay R6 will cause opening of the associated switch S6–2b and thus interrupt the aforementioned holding circuit of relay R9 if the same should then be closed on ascent of the gate. Further, energization of the relay R6 will close the associated normally-open switch S6–2a and open the associated normally-closed main switch S6–1b. Closure of the switch S6–2a in this fashion will immediately close the gate-closing motor circuit via this switch and thus cause closure of the gate to its fully closed position in which this motor circuit is opened at switch S6–2a due to deenergization of relay R6 as a result of opening of limit switch SCL–1b by the gate in its fully closed position. The gate will then remain in its fully closed position since by the explained opening of the main switch S6–1b the holding circuit of the conductors DM1 and DM2 is interrupted at switch S1–1, and the installation will then remain inoperative until an opening signal is sent from the central station to close normally-open switch S1.

With the closure in this fashion of switch S1, the installation is restored to operation, with the immediate result being closure of the starting circuit of relay R1 via switches S6–1b and S1, and closure of the holding circuit of this relay via switch S1–1 the moment relay R1 is energized. With the closure of switch S1–1, the circuits of the conductors DM1 and DM2 are also conditioned for closure when the conductive track 16 is in operative alignment with the respective conductors DM1 and DM2 of the control component C. The installation is then ready to respond again, in normal operation to calls for more or less water at the station S, or in the explained different operation when on a call for more water the gate should reach its uppermost position.

Figure 5:
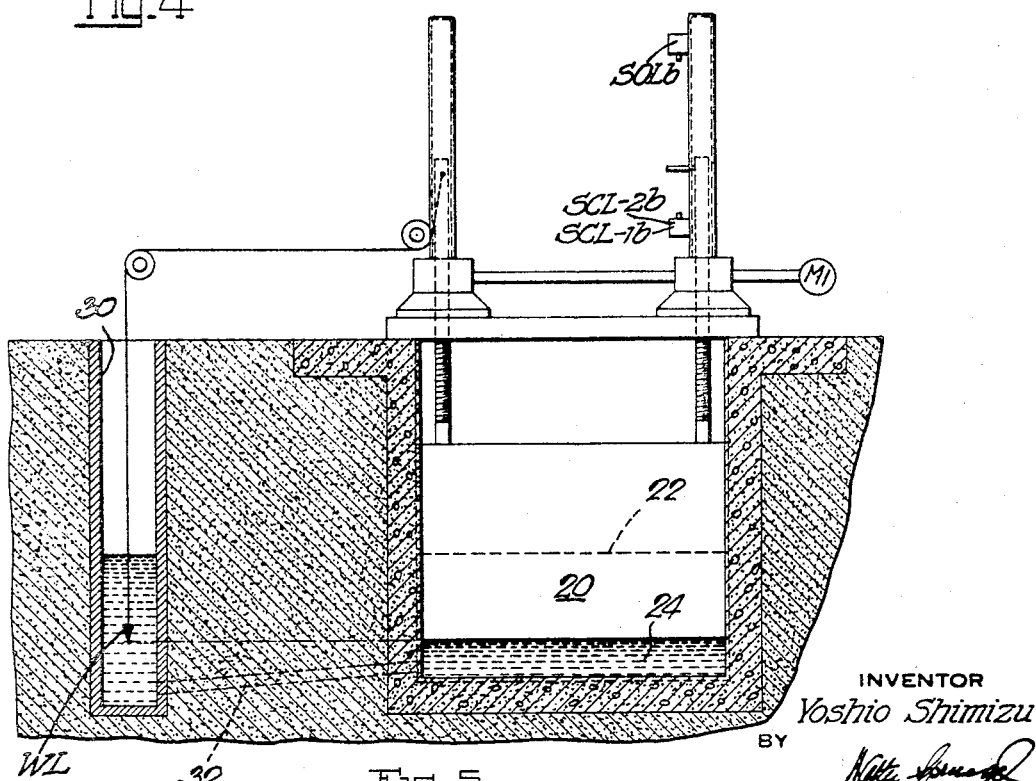
FIG. 5 is a fragmentary section through a waterway at a dividing gate.

Among the special conditions under which the installation will also perform differently is the one already mentioned when the water level upstream of the gate 20 should at any time drop below the gate, in which case the gate will immediately be fully closed. To this end, there is provided an electrode WL (FIG. 5) which at the bottom level of the gate 20 rises and falls with the latter and is arranged for immersion in the water next to the gate on the upstream side thereof. Conveniently, the electrode WL is led into a separate container 30 which through a bottom conduit 32 is in communication with the main waterway 22 directly behind the gate 20 so that the water in the container 30 and main waterway 22 is at the same level (FIG. 5). If the water level in the main way should at any time drop below the bottom of the gate 20 and the electrode WL become non-grounded in consequence, a switch SWLB associated with the electrode WL (FIG. 3) will assume normally closed position and thereby cause energization of a relay R8 which then closes the associated switch S8 for energization of relay R7. Relay R7 also closes an associated switch S7–1 and thereby closes a holding circuit for the relay. With relay R7 thus energized, the same will open switch S7b to break the timer circuit, and will also close switch S7–2 for closure of the gate-closing motor circuit via the latter switch, device MS2 and the closing limit switch SCL–2b, whereby the gate will fully close without intervention of the timer TL. When the gate reaches fully closed position, the same opens the gate-closing motor circuit at closing limit switch SCL–2b and the gate stops until on the next call for more water at station S the gate again opens on closure of the gate-opening motor circuit via switches S10b, S4–1a, SMS2, MS1 and SOLb. Unless in the course of such gate opening the water level at station S is within the normal lower and upper limits and the water level in the main waterway has risen to again reach and ground the electrode WL, the gate will open fully, and then close and open again, without timer intervention, until the water condition just mentioned is reached or the closure swtich SC operated to interrupt operation of the installation in the previously described manner.

The installation also includes several indicating lights. Thus, when relay R1 is energized and the holding circuits for the conductors DM1 and DM2 closed, this is indicated by a lamp GL in a circuit which is then closed at the switch S1–2 which is associated with the relay R1. Further, in the holding circuit of relay R10 there is in parallel with the latter a lamp BL which lights up to indicate normal operation of the installation and which is unlighted at any of the described special operations of the installation. Further, a lamp RL in parallel with relay R7 in the holding circuit of the latter will light up to indicate trouble on any of the described special operations of the installation.

Figure 3:
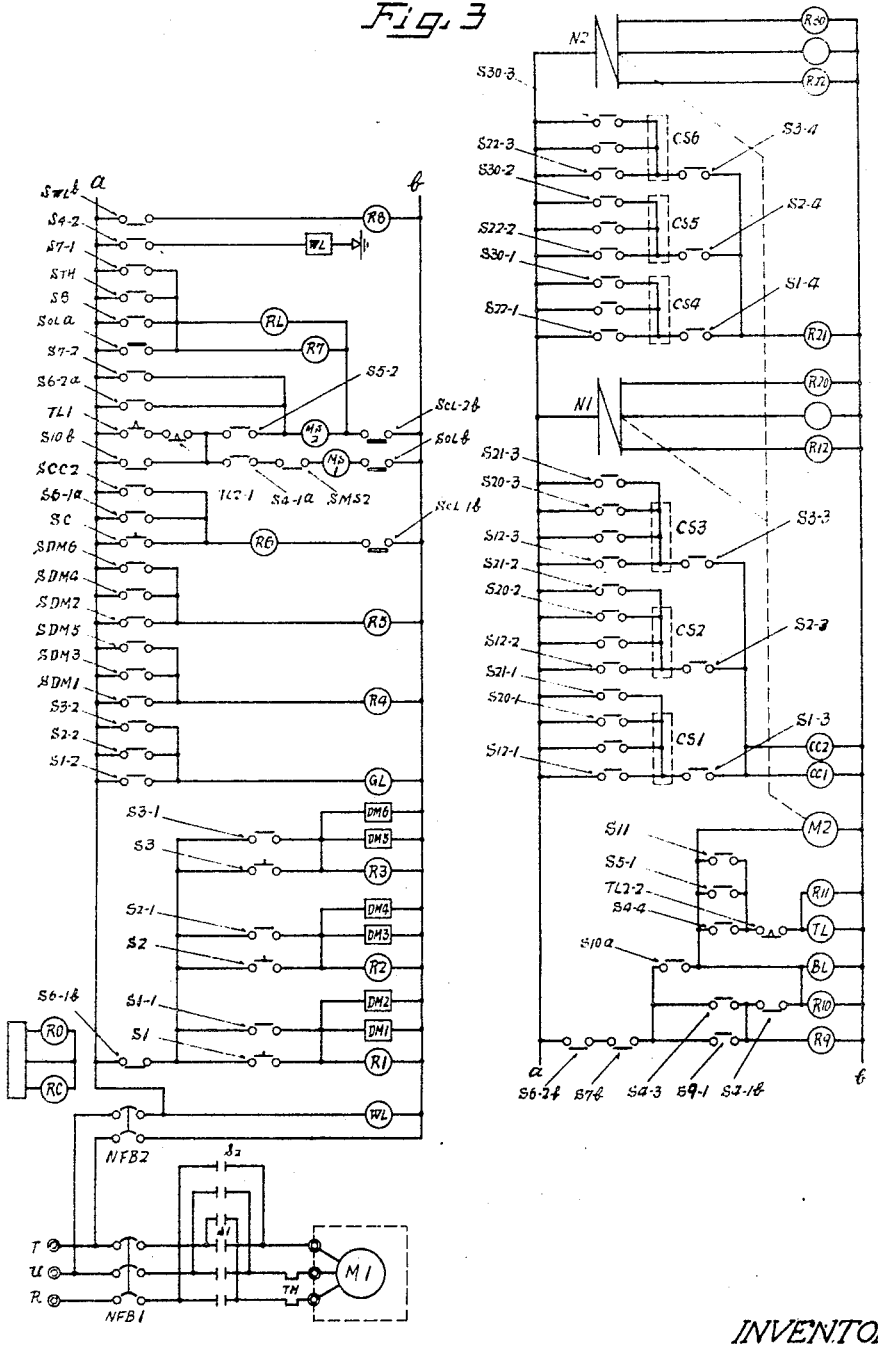
FIG. 3 is a wiring diagram of the various controls of the apparatus.

The installation also includes a flow meter CC1 which is operative when a motor M2 operates (FIG. 3). The circuit of the motor across the power source a, b is via switchs S6–2b, S7b and S10a, wherefore the flow meter operates when the switch S10a is closed, i.e., in normal operation of the installation when the water level at station S is within normal limits or is brought within normal limits under sole normal gate control of the conductive track 16.

While any suitable flow meter may be used, the one used in the present installation provides in this instance two switch devices of which one, and under certain conditions both, deliver to the flow meter CC1 electric pulses of a presettable number per time unit which is proportional to a calculated waterflow quantity per the same time unit in the divided waterway 24, with these pulses actuating relays to advance a water quantity indicating dial or the like of the flow meter which is in the form of an electromagnetic counter. One of these switch devices includes a cam N1 with magnetic means to cause on the timed drive of this cam closure of certain ones of associated switches S12–1 to S20–1 and passage of a preselected number of pulses per time unit through a switch means CS1 to the counter for registering the corresponding waterflow quantity. Thus, with the cam N1 being driven by the motor M2 through one revolution per 100 seconds, for example, the switch device, involving cam N1 and switches S12–1 to S20–1, is adjusted, for a calculated waterflow quantity of exemplary 3 m.$^3$ per second, to pass, via rotary switch CS1 and switch S1–3, 3 pulses to the flow meter during each revolution of cam N1, with the flow meter then being actuated to indicate the right flow quantity at an increase with lapse of time by 3 m.$^3$ per second. As another example, if this same device should be set for a calculated waterflow quantity of exemplary 8 m.$^3$ per second, 8 pulses would be delivered to the counter during each revolution of cam N1. In order that this same device may be set for a calculated water flow quantity in exemplary three figures per time, such as 182 m.$^3$ per second, there are provided additional switches S12–2 to S20–2 rotary switches CS2 and CS3, and switches S2–3 and S3–3, and S12–3 to S20–3, and the device is preset to deliver a corresponding number of pulses to the flow meter for each revolution of cam N1.

The other switch device involves a cam N2 and series of switches S22–1 to S–30–1, S22–2 to S30–2 and S22–3 to S30–3, and associated rotary switches CS4, CS5 and CS6 and switches S1–4, S2–4 and S3–4, with this device being presettable to indicate on the flow meter fractions of 1 m.$^3$ per second of the calculated waterflow quantity up to 3 figures in accordance wtih the exemplary 3 switch series. With this other switch device being adapted to indicate fractions in tenths of 1 m.$^3$ in the waterflow quantity, the cam N2 is driven by the motor M2 through one revolution per 1000 seconds. Thus, if the calculated waterflow quantity is, for example, 3.5 m.$^3$ per second, the first switch device is set to deliver to the flow meter 3 pulses for each revolution of cam N1 (100 seconds) while the other switch device is set to deliver, via switch S21–1, 5 pulses to the flow meter for each revolution of cam N2 (1000 seconds). Therefore, the total number of pulses received by the flow meter will be 30 pulses plus 5 pulses, i.e., 35 pulses for each 1000 seconds, and this will operate the flow meter to indicate the correct water flow quantity at an increase of 3.5 m.$^3$ per second. If, for example, the calculated waterflow quantity were 3.55 m.$^3$ per second, the first switch device would be preset involving the switch series S22–1 to S30–1, and the second switch device would be preset to involve the switch series S22–2 to S30–2. Associated with the flow meter CC1 is a water quantity presetting device CC2 which is a resettable electro-magnetic counter and receives the same pulses as the flow meter CC1. This device may be preset to any given water flow quantity, and when the same reaches in its count-off this given water quantity it will close an associated switch SCC2 and thereby cause energization of relay R6 with ensuing full closure of the gate and opening of the main switch S6–1b for inactivation of the installation until an opening signal is sent for restoring the installation to operation.

As already mentioned, there might be any number of divided waterways branching from the main waterway, and each divided waterway may have its gate individually controlled in explained manner in the same overall installation, with most controls being preferably at a central station and suitably wired with the electrical control components at the respective gates and control stations.

For ready identification of major control switches, relays and certain other parts of the installation in the appended claims, these switches, relays and parts are referred to in the claims as follows. Switches S4–1a and S5–2 are referred to as "first" and "second" switches, respectively, while switches S6–2b, S6–2a, SC, S7b, S7–2, SOLa and S8 are referred to as "third" to "ninth" switches, respectively. Switches S4–4 and S5–1 are referred to as "first timer switch" and "second timer switch," respectively. Switches TL1 and TL2–1 are referred to as "common switch means," while switches SDM1 and SDM2 are referred to as "opening" and "closing" switches, respectively, and switch S6–1b is referred to as "main" switch. The conductive track 16 is referred to as "common conductor," while elements DM1 and DM2 are referred to as "first" and "second" conductors, respectively. Switches SCC2 and S6–1a are referred to as "further" switches, respectively, and switches S1–1 and S1 are referred to as "first control switch" and "signal switch" respectively. Relays R4, R5, R6, R7, R8 and R1 are referred to as "first" to "sixth" relays respectively.

What is claimed is:
1. Apparatus for regulating waterflow in a part of a channel downstream of a gate therein, comprising a float rising and falling with the water level at a station in said channel part remote from said gate; a motor for opening and closing said gate; first and second electric motor circuits including first and second normally-open switches, respectively, with said first and second circuits, when closed, causing the motor to move said gate in opening and closing directions, respectively; first control means including said float and operative to cause closure of said first and second switches when the water level at said station is below and above predetermined lower and upper limits, respectively, and to maintain said first and second switches closed until the water level at said station is restored to said predetermined lower and upper limits, respectively; and a device including a timer and operative on and during closure of either of said first and second switches cyclically to close and open the respective motor circuit after predetermined time intervals, respectively.

2. Apparatus as in claim 1, which further provides another gate-closing motor circuit including a fourth switch which when open and closed opens and closes said other circuit; and other control means operable to close said fourth switch and render said first control means inoperative.

3. Apparatus as in claim 2, which further provides a waterflow meter, and an electric operating circuit therefor including a normally-closed third switch closing said meter circuit, and said other control means is also operatively associated with said third switch and, when operated, opens the latter.

4. Apparatus as in claim 1, in which said first motor circuit includes a normally-closed limit switch which is opened by said gate in its fully open position to open said first motor circuit, and there is further provided another gate-closing motor circuit including a normally-open seventh switch which when closed closes said other motor circuit; and other control means operative on opening of said limit switch to close said seventh switch and render said device inoperative.

5. Apparatus as in claim 4, which further provides a waterflow meter, and an electric operating circuit therefore including a normally-closed sixth switch which when closed closes said meter circuit, and said other control means is also operatively associated with said sixth switch and, when operative, opens the latter.

6. Apparatus as in claim 1, which further provides another gate-closing motor circuit including a normally-open seventh switch which when closed closes said other motor circuit; and other control means associated with said seventh switch and device and including an electrode at and movable with said gate on the upstream side and on the bottom level thereof, with said other control means being operative on emergence of said electrode from the water on the upstream side of the gate to close said seventh switch and render said device inoperative.

7. Apparatus as in claim 6, which further provides a water flow meter, and an operating circuit therefore including a normally-closed sixth switch which when closed closes said meter circuit, and said other control means is also operatively associated with said sixth switch and, when operative, opens the latter.

8. Apparatus for regulating waterflow in a part of a channel downstream of a gate therein, comprising a float rising and falling with the water level at a station in said channel part remote from said gate; a motor for opening and closing said gate; first and second electric motor circuits including common switch means and first and second normally-open switches, respectively, with said first and second circuits, when closed, operating said motor to move said gate in opening and closing directions, respectively; a first control circuit including a first relay adapted when energized to close said first switch, and a normally-open opening switch which when closed closes said first control circuit; a second control circuit including a second relay adapted when energized to close said second switch, and a normally-open closing switch which when closed closes said second control circuit; third and fourth control circuits including a common normally-closed main switch, a common conductor moving with said float, and first and second conductors, respectively, which on current passage therethrough close said opening and closing switches, respectively, with said third and fourth control circuits being closed when said main switch is closed and said common conductor is electrically connected with said first and second conductors, respectively, and said common conductor being electrically connected with said first and second conductors when the water level at said station is below and above predetermined lower and upper limits, respectively; a timer circuit including a timer, a normally-closed third switch, and first and second normally-open timer switches which are in parallel and closed on energization of said first and second relays, respectively, with said timer circuit being closed when said third switch and either of said first and second timer switches are closed, and said timer circuit, when closed, operating said switch means alternately to close and open the respective motor circuit after predetermined time intervals, respectively; another gate-closing motor circuit including a normally-open fourth switch which, when closed, closes said other motor circuit; and a fifth control circuit for said other motor circuit including a third relay adapted, when energized, to close said fourth switch and open said main and third switches, and a fifth switch which when closed closes said fifth control circuit.

9. Apparatus as in claim 8, which further provides a waterflow meter and an electric operating circuit therefor including said third switch, with said meter circuit being closed when said third switch is closed.

10. Apparatus as in claim 8, in which said fifth control circuit includes a normally-open further switch in parallel with said fifth switch, and there is further provided a resettable waterflow meter presettable to any desired overall water quantity and, when operating, counting-off water quantity at a given rate; an electric meter operating circuit including said third switch and being closed when the latter is closed; and control means operative when the count-off of the meter reaches the preset water quantity to close said further switch.

11. Apparatus as in claim 8, in which said timer circuit further includes a normally-closed sixth switch in series with said third switch, and said first motor circuit further includes a normally-closed limit switch which is opened by said gate in its fully open position to open said first motor circuit, and there is further provided a third gate-closing motor circuit including said limit switch and a normally-open seventh switch in series, with said third motor circuit being closed when said limit switch and seventh switch are closed; and a sixth control circuit including an eighth switch operatively associated with said limit switch to open and close when the latter closes and opens, respectively, and a fourth relay adapted, when energized, to close said seventh switch and open said sixth switch, with said sixth control circuit being closed on closure of said eighth switch to cause closure of said gate with said timer circuit open.

12. Apparatus as in claim 11, which further provides a waterflow meter, and an electric operating circuit therefor including said third and sixth switches and being closed when the latter switches are closed.

13. Apparatus as in claim 8, in which said timer circuit further includes a normally-closed sixth switch in series with said third switch, and there is further provided a third gate-closing motor circuit including a normally-open seventh switch which when closed closes said third motor circuit; a sixth control circuit including a fourth relay adapted when energized to close said seventh switch and open said sixth switch, and a normally-open ninth switch which when closed closes said sixth control circuit; and a seventh control circuit including a fifth relay adapted when energized to close said ninth switch, and an electrode at said gate on the upstream side thereof and movable therewith at the bottom level thereof, with said seventh control circuit being closed when said electrode emerges from the water level on the upstream side of the gate to thereby cause closure of said gate with said timer circuit open.

14. Apparatus as in claim 13, which further provides a waterflow meter, and an electric operating circuit therefor including said third and sixth switches and being closed when the latter switches are closed.

15. Apparatus as in claim 8, in which said fifth control circuit includes a normally-open further switch which is in parallel with said fifth switch and closed by said third relay when energized, and a normally-closed limit switch which is in series with said third relay and opened by said gate in its fully closed position, and said third and fourth control circuits further include a common normally-open first control switch, and there is provided another control circuit including said main switch, said first control switch and a normally-open signal switch in parallel with said first control switch, and a sixth relay adapted when energized to close said first control switch, with said other control circuit being closed when said main switch and signal switch are closed, whereby on opening of said limit switch by the gate in its fully closed position said third and fourth control circuits remain open until said signal switch is closed, and closure of said signal switch conditioning said third and fourth control circuits for closure when the water level at said station is below and above said lower and upper limits, respectively.

References Cited

UNITED STATES PATENTS

| 2,932,171 | 4/1960 | Ranson | 61—28 |
| 3,176,469 | 4/1965 | Fowler | 61—22 |
| 3,384,967 | 5/1968 | Jarnagin | 73—313 X |

FOREIGN PATENTS

| 1,339,094 | 8/1963 | France. |
| 643,302 | 4/1937 | Germany. |

JACOB SHAPIRO, Primary Examiner

U.S. Cl. X.R.

61—28; 73—313; 137—41, 87, 386